(12) United States Patent
Ding et al.

(10) Patent No.: US 11,529,577 B2
(45) Date of Patent: *Dec. 20, 2022

(54) MA-M2T SPINEL SOLID SOLUTION ENHANCED MAGNESIUM OXIDE-BASED CERAMIC FOAM FILTER AND PREPARATION METHOD THEREFOR

(71) Applicants: FENGYANG AIERSI LIGHT ALLOY PRECISION MOLDING CO., LTD, Anhui (CN); SHANGHAI JIAOTONG UNIVERSITY, Shanghai (CN); NANJING UNIVERSITY OF AERONAUTICS AND ASTRONAUTICS, Jiangsu (CN)

(72) Inventors: Zhiguang Ding, Shanghai (CN); Zili Liu, Jiangsu (CN); Xiqin Liu, Jiangsu (CN); Bing Ye, Shanghai (CN); Wenjiang Ding, Shanghai (CN)

(73) Assignees: FENGYANG AIERSI LIGHT ALLOY PRECISION MOLDING CO., LTD., Anhui (CN); SHANGHAI JIAOTONG UNIVERSITY COLLEGE OF MATERIALS, Shanghai (CN); NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 358 days.

This patent is subject to a terminal disclaimer.

(21) Appl. No.: 16/753,572

(22) PCT Filed: Jun. 1, 2018

(86) PCT No.: PCT/CN2018/089574
§ 371 (c)(1),
(2) Date: Apr. 3, 2020

(87) PCT Pub. No.: WO2019/196183
PCT Pub. Date: Oct. 17, 2019

(65) Prior Publication Data
US 2020/0324236 A1    Oct. 15, 2020

(30) Foreign Application Priority Data
Apr. 8, 2018    (CN) .......................... 201810307620.8

(51) Int. Cl.
*B01D 39/20*    (2006.01)

(52) U.S. Cl.
CPC ............................... *B01D 39/2093* (2013.01)

(58) Field of Classification Search
CPC ................................................ B01D 39/2093
See application file for complete search history.

(56) References Cited

U.S. PATENT DOCUMENTS 3,962,081 A   6/1976 Yarwood et al.
4,024,212 A   5/1977 Dore et al.
(Continued)

FOREIGN PATENT DOCUMENTS

CN    87102516 A    11/1988
CN    1473947 A      2/2004
(Continued)

*Primary Examiner* — Scott R Kastler
(74) *Attorney, Agent, or Firm* — Hudak, Shunk & Farine Co. LPA

(57) ABSTRACT

An MA-M₂T spinel solid solution-reinforced magnesium oxide-based ceramic foam filter and a preparation therefor. The preparation method comprising: 1) preparing a ceramic slurry having a solid content of 60%-70% by dosing 15%-25% by mass of a nanometer alumina sol, 0.8%-1.5% by mass of a rheological agent, and the balance magnesium oxide ceramic powder comprising a nanometer titanium oxide sintering aid, and then adding deionized water and ball milling to mix until uniform, and then vacuum degassing the mixture; 2) soaking a polyurethane foam plastic template into the ceramic slurry, squeezing by a roller press the
(Continued)

polyurethane foam plastic template to remove redundant slurry therein to make a biscuit, and drying the biscuit by heating it to 80° C.-120° C.; 3) putting the dried biscuit into a sintering furnace, elevating the temperature to 1400° C.-1600° C. and performing a high temperature sintering, cooling to the room temperature with the furnace to obtain the magnesium oxide-based ceramic foam filter.

9 Claims, 1 Drawing Sheet

(56) References Cited

U.S. PATENT DOCUMENTS

| | | |
|---|---|---|
| 4,056,586 A | 11/1977 | Pryor et al. |
| 2003/0146151 A1 | 8/2003 | Chi et al. |
| 2020/0316505 A1* | 10/2020 | Liu .................. C04B 35/04 |
| 2020/0324236 A1* | 10/2020 | Ding .................. B01D 67/0041 |

FOREIGN PATENT DOCUMENTS

| | | |
|---|---|---|
| CN | 101138691 A | 3/2008 |
| CN | 100536986 C | 9/2009 |
| CN | 101708401 A | 5/2010 |
| CN | 101785944 B | 12/2011 |
| CN | 103553686 A | 2/2014 |
| CN | 103787691 A | 5/2014 |
| JP | H01108177 A | 4/1989 |

\* cited by examiner

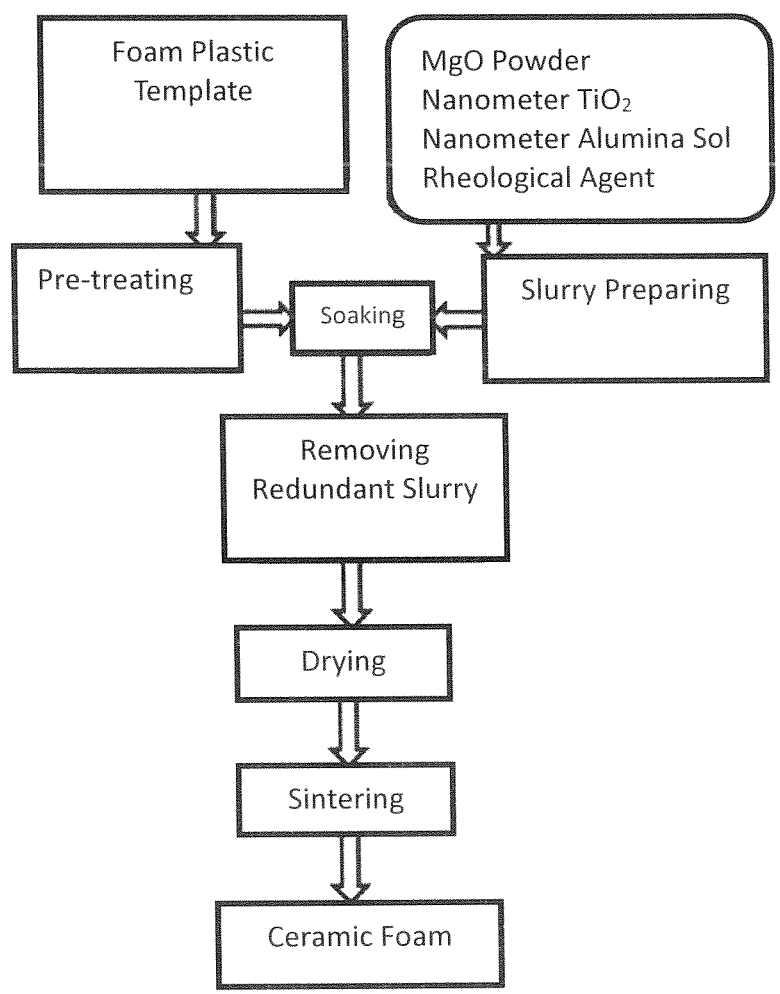

MA-M2T SPINEL SOLID SOLUTION ENHANCED MAGNESIUM OXIDE-BASED CERAMIC FOAM FILTER AND PREPARATION METHOD THEREFOR

TECHNICAL FIELD

The present invention relates to a magnesium oxide-based ceramic foam filter and a method for preparing the same, in particular, an MA-M$_2$T spinel solid solution-reinforced magnesium oxide-based ceramic foam filter and a method for preparing the same, and it relates to the field of metal materials and metallurgy. The filter prepared in accordance with the present invention is especially suitable for filtration and purification of a melt of magnesium and alloys thereof, but can also be used for filtration and purification of a melt of aluminum and alloys thereof.

BACKGROUND ART

Magnesium is chemically active and can react easily with oxygen, nitrogen and water vapor in the process of casting or handling, and the formed products may be left in magnesium, which would affect the internal quality of the article and degrade the properties of the same. According to the variety and nature of inclusions in a magnesium alloy, the inclusions are generally divided into two categories: metal inclusions and non-metal inclusions. 1) Metal inclusions: In the process of original magnesium production and subsequent handling of a magnesium alloy, some pure metals or metallic compound inclusions would be inevitably introduced, and they would present in the matrix or at the grain boundary of the magnesium alloy in the form of particles or clusters, including primarily pure metal α-Fe particles, Mn—Fe metallic compounds, such as, for example, (Fe, Mn)$_3$Si, (Fe, Mn)$_5$Si$_3$, among others; 2) non-metal inclusions: Non-metal inclusions in an magnesium alloy are primarily nitrides and oxides of magnesium, such as, for example, MgO, Mg$_3$N$_2$, among others; refining agents added in the process of smelting of magnesium alloy, primarily chlorides, such as KCl, NaCl, MgCl$_2$, among others; since the fluxing agents in the refining process cannot be removed completely, some small amount of residual fluxing agents may be present in the magnesium melt, resulting in fluxing agent inclusions in the magnesium metal. The floating oxide inclusions will be pushed to the grain boundaries by the crystallizing front, and the inclusions will be generally present at the grain boundaries of the magnesium alloy in the form of films, particles, or clusters. Statistics show that MgO accounts for more than eighty percent of all inclusions in a magnesium alloy, and is distributed in the form of films, particles, and clusters. The inclusions generated in the process of melting and casting of a magnesium alloy will not only seriously degrade the mechanical properties and anti-corrosion performance of the alloy, but also degrade the machining quality and surface quality of anodic oxidation treatment thereof. With respect to a die-casting magnesium alloy, the content of oxides in the form of films and particles inside the alloy needs to be controlled respectively below 100 cm$^2$/Kg and 100 mm$^3$/Kg to satisfy the normal operating requirements. Therefore, the purification process has been critical in the melting and casting process for removing inclusions in a magnesium melt in order to increase the purity thereof.

Melt purification process can be classified into two categories: flux purification and non-flux purification. Due to high inclusion removing efficiency, low cost, convenient operation, flux purification process has become a commonly used purification process in the manufacture of magnesium alloys. However, flux purification also exhibits disadvantages, such as, for example, increase of metal loss, flux inclusions, inability of degassing, among others. In particular, when a rear earth magnesium alloy is smelted and refined, the flux will also consume a large amount of rare earth elements in the alloy. Non-flux purification process can not only compensate for the deficiencies of flux purification process, but also exhibit excellent purification results, and thus is an important melt purification process being used and developed. Various non-flux purification technologies, such as filtration purification, spinning spraying purification, electromagnetic purification and ultrasonic wave treatment, among others, have been developed. Compared to simple metal net melt filtration, ceramic foam filters comprising particular 3-D porous ceramic structures have very good filtration effects with respect to inclusion particles in an alloy melt through filter cake effect, adsorption effect and rectification effect due to their high porosity (70%-90%), strong adsorbability, chemical corrosion resistance, among others. Ceramic foam filtration method can not only filter out fine inclusion particles as small as 10 μm-20 μm in an alloy melt, but also can filter out liquid flux inclusions that cannot be filtered out by a general filtering medium.

U.S. patent documents U.S. Pat. No. 3,962,081 A (Ceramic foam filter), U.S. Pat. No. 4,024,212A (Ceramic foam and method of preparation) and Chinese patent document CN 103,787,691 A (A method for preparing an aluminum oxide ceramic foam) disclose methods of using Al$_2$O$_3$, ZrO$_2$, SiC or SiO$_2$—based ceramic foams for filtering inclusions in aluminum alloy or steel or iron melts; however, the standard free enthalpy of formation of MgO is very low, and the highly active Magnesium melt is very prone to react with the matrix material of the ceramic foam in accordance with the equations (1)-(4) and dissolved quickly, and accordingly blocks the filtration holes, or melts and corrodes and enters the melt of magnesium or an alloy thereof, as hazardous components. Thus, the ceramic foams of current materials are not suitable for filtration of magnesium and the alloys thereof.

  (1)

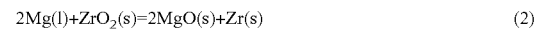  (2)

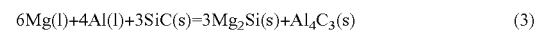  (3)

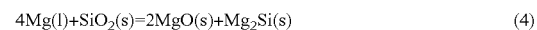  (4)

MgO is with a NaCl structure, cubic system, lattice constant being 0.411 nm, and is an ionic bond compound, melting point being 2852° C., which is much higher than commonly used Al$_2$O$_3$ (2054° C.) and SiO$_2$ (1650±50° C.). Therefore, articles formed of magnesium oxide exhibit characteristics such as good chemical stability, high resistivity and anti-erosion abilities to metals, slag and alkaline solutions. Compared to commonly used ceramic materials, MgO exhibits good high temperature chemical stability against magnesium and the alloys thereof, does not react with the flux inclusions comprised of molten chlorides and fluorides, and has a relatively small wetting angle with respect to the flux inclusions and thus readily adsorb the same in magnesium melt. Accordingly, MgO ceramic foams are ideal materials for smelting, refining and purification of magnesium alloys.

It would be a necessary and most critical step of preparing ceramic materials to perform sintering below the melting point of the oxide components, and the sintering and grain growing process at a high temperature will decide the micro-structure and performance of a ceramic material. Chinese patent documents CN 1,011,306 B (Pure Magnesium Oxide Ceramic Foam Filter and Process of Preparing the Same), CN 101,138,691A (Method of Preparing Magnesium Ceramic Foam Filter for Casting) disclose using pure magnesium oxide as the starting material to produce ceramic filters. Since MgO has a very high melting point and thermal expansion coefficient ($13.5 \times 10^{-6}$/° C.), the sintering of the same is difficult (the sintering temperature should not be lower than 0.8 of its melting point) and the thermal shock resistance is poor, which limit the use and development of MgO ceramic foams.

Researches show: when the sintering temperature in a ceramic sintering process is decreased by 100° C., the heat consumption for unit product will be reduced by 10%. An important technical means of decreasing the sintering temperature of MgO ceramic foam is addition of a sintering aid. When $V_2O_5$ powder is added, MgO and $V_2O_5$ will form a liquid phase having a formula similar to $Mg_3V_2O_8$ at 1190° C. to facilitate the sintering and decrease the sintering temperature of a MgO ceramic foam significantly. However, in use, $V_2O_5$ will cause damages to respiratory system and skin, and accordingly strict restrictions are imposed on the operations thereof. Same to $V_2O_5$, cobalt oxide is also a good low temperature sintering aid, but the use is restricted due to its highly toxic nature and rare resources. Fluorides are commonly used strong solubilizer and mineralizer in ceramic industrial sintering. Chinese patent documents CN 100,536,986 C (Magnesium Oxide Ceramic Foam Filter), CN 1,473,947 A (Ceramic Foam for Purification of Magnesium and Magnesium Alloys) and CN 101,785,944 B (Method of Preparing Magnesium Ceramic Foam for Filtration of Magnesium and Magnesium Melt) disclose adding fluorite (melting point: 1423° C.) and magnesium fluoride (melting point: 1248° C.), wherein the solid solution of the fluoride during sintering would increase the lattice distortion of the magnesium oxide matrix, and the fluoride would be prone to form a liquid having a lower melting point, so as to decrease the sintering temperature of the magnesium oxide ceramic. However, in the sintering process, fluorine in the fluorides would be bonded with Si, Al, Fe and Ca, and most of them (account for about 70% in production of tiles) is volatilized in gas form, which would not only erode the ceramic body and degrade the quality of the sintered ceramic, but also, more seriously, it would be discharged to the atmosphere and cause fluoride contamination. Fluorides can enter human body via respiratory tract, digestive tract and skin, and have toxic effect on central nervous system and myocardium. Low concentration fluoride contamination would result in crispy calcification of teeth and bones. Pollutant Discharge Standard of Ceramic Industry (GB25464-2010) provides that the fluoride discharge standard must be less than 5.0 mg/m$^3$, while using a fluoride as low temperature sintering aid for a magnesium oxide ceramic would inevitably increase discharge of gaseous fluorides and increase the burden of environmental protection investment. Furthermore, the fluoride particles in the residual solubilized fluorides in the ceramic are present in the form of substituted oxygen ions, which would result in decrease of chemical stability of intergranular bonds and difficulty of resisting long period of erosion by the flux inclusions in the magnesium melt. In the slurry for preparing the ceramic foam filter disclosed in Chinese patent document CN 101,138,691 A, sodium silicate, a silica sol and ethyl silicate are used as adhesives, and the component $SiO_2$ present between the sintered foam ceramic particles are prone to react with the melt of magnesium and the alloys thereof in accordance with equation (4), which also decreases the chemical stability of the ceramic foam. In the Chinese patent documents CN 100, 536,986 C (Magnesium Oxide Ceramic Foam Filter) and CN 103,553,686 A (A Magnesium-Alumina Spinel Ceramic Foam Filter and Method of Preparing the Same), diboron trioxide and sodium borate are used as the low temperature sintering aids for the magnesium oxide ceramic. Diboron trioxide will form a liquid at a temperature higher than 450° C., and when sintering temperature is higher than 1350° C., it will react with magnesium oxide to form magnesium borate present in a liquid form, so as to decrease the sintering temperature. However, diboron trioxide is prone to react with magnesium and aluminum, and thus is not stable in the magnesium alloy or aluminum alloy melt. Moreover, since diboron trioxide can be dissolved in a solvent, such as water and ethanol, it can absorb water in the air mightily to form boric acid. The diboron trioxide added in the process of preparation of a ceramic foam will be dissolved in water to form a water solution of boric acid, which is prone to react with magnesium oxide to form a magnesium borate precipitate, so as to reduce its effect. Gallium oxide is a family oxide of diboron trioxide, and forms a spinel-type $MgGa_2O_4$ with magnesium oxide at a low temperature, so as to decrease the sintering temperature. However, gallium has rare resources (gallium is a strategic reserved metal), and the higher cost has limited its use in general ceramics.

SUMMARY OF THE INVENTION

The present invention provides an MA-$M_2T$ spinel solid solution-reinforced magnesium oxide-based ceramic foam filter that can be sintered at low temperature, has excellent chemical stability and thermal shock resistance, and a method for preparing the same.

In order to achieve the above-identified technical objective, the technical solution of the present invention are as follows:

An MA-$M_2T$ spinel solid solution-reinforced magnesium oxide-based ceramic foam filter that is obtained by coating onto a polyurethane foam carrier a slurry of a magnesium oxide-based ceramic comprising a nanometer titanium oxide sintering aid, and then drying and sintering.

A method for preparing a spinel solid solution-reinforced magnesium oxide-based ceramic foam filter comprising the steps of:

(1) Preparing a ceramic slurry having a solid content of 60%-70% by dosing 15%-25% by mass of a nanometer alumina sol, 0.8%-1.5% by mass of a rheological agent, and the balance magnesium oxide ceramic powder comprising a nanometer titanium oxide sintering aid, and then adding deionized water and ball milling to mix until uniform, and vacuum degassing. The added nanometer alumina sol forms $\gamma$-$Al_2O_3$ coating film on the surfaces of the light calcined magnesium oxide particles and the highly uniformly dispersed nanometer $TiO_2$ powder, and in the sintering process, $\gamma$-$Al_2O_3$ in the alumina sol will perform an in-situ reaction with MgO in contact with it and form a Mg—Al spinel phase ($MgAl_2O_4$, MA), MA and $M_2T$ are completely dissolved with each other at a temperature above 1350° C. The XRD analysis results show that the ceramic foam filter prepared in accordance with the present invention comprises only periclase MgO and MA-$M_2T$ spinel solid solution phases.

The rheological agent is a mixture of polyacrylic acid and a cellulose ether, wherein polyacrylic acid accounts for 20% of the mass of the rheological agent, the cellulose ether is one of industrially used hydroxyethyl cellulose and hydroxy propyl methyl cellulose, or a mixture thereof. The Cellulose ether and polyacrylic acid are not only a good dispersant for the nanometer titanium oxide powder which can prevent the slurry from agglomeration, but also functions as an adhesive in preparing a biscuit. Upon soaking, the slurry can be securely adhered to a polyurethane foam template such that the biscuit will have a very big strength, and the cellulose ether and polyacrylic acid can escape very easily in the sintering process without contaminating the articles, so as to ensure the quality of the ceramic foam filter.

The magnesium oxide ceramic powder comprising a nanometer titanium oxide sintering aid is a mixture of a magnesium oxide powder and a nanometer titanium oxide powder. By adding nanometer titanium oxide to the ceramic component, as a changeable electrovalence oxide, $Ti^{4+}$ will be dispersed into the crystal of MgO, which increases defects in the crystal (such as, for example, vacancies) that activate the lattice, and forms a solid solution that $Mg^{2+}$ ions are substituted by $Ti^{4+}$ ions, thereby facilitating direct intergranular bonding. The lattice constant of $Al_2O_3$ is close to that of MgO, and in the sintering process, $Al_2O_3$ can be solid-solubilized to the lattices of MgO and cause a lattice distortion to the MgO crystal. The diffusion rate of $Al^{3+}$ is small, and the solubility of $Al_2O_3$ in periclase MgO is very small (only 3% at 1700° C.). The sintering process is primarily to form a new compound MA phase through sintering reactions, and a limited solid solution between the MA phase and MgO, so as to facilitate the sintering and the bonding of the particles. Nanometer powder means a superfine powder having a particle size less than 100 nm, and has the characteristics of high specific surface area, high surface energy and high activity, among others. Therefore, a nanometer powder can be readily bonded with other atoms, and the melting point and sintering temperature would be much lower than a fine powder. The sintering aid added in the form of nanometer titanium oxide and nanometer alumina sol can fill the space between the fine powder particles, which optimizes the match and mixing uniformity of ceramic particles. Furthermore, due to the nanometer powder's surface and interface effect, the full contact of the nanometer titanium oxide and the highly active nanometer $\gamma$-$Al_2O_3$ in the alumina sol with the MgO particles will increase the reaction speed quickly, thereby decreasing the sintering temperature and increasing the density and mechanical properties thereof, and the decrease of the sintering temperature will be helpful in reducing the energy consumption and the production cost of the ceramic foam filter. The magnesium oxide powder is a fused magnesium oxide with a high anti-hydration ability and a particle size in the order of 250-500 meshes (mean diameter $d_{50}$ being 25 μm-58 μm). The particulate fused magnesium oxide is wrapped by continuous nanometer alumina sol film and in close contact with highly dispersed nanometer titanium oxide particles, which in the sintering process perform in-situ reactions with MgO to form a Mg—Al spinel MA phase and a Mg—Ti spinel $M_2T$ phase, which are fully dissolved with each other at a temperature above 1350° C., directly weld the MgO particles together in the sintering process and form intergranular secondary spinels (intergranular spinel) $M_2T$ and MA by exsolution precipitation upon cooling, which may compensate for the stress at the phase interfaces which results in a stress relaxation of the material when cooled after sintering. Furthermore, the pinning effect of the spinel solid solution phases will inhibit the fast growth of MgO particles, so as to refine the microstructure of the ceramic foam and increase the compactness of the ceramic.

The nanometer titanium oxide powder accounts for 1%-2% by mass of the ceramic powder, and has a particle size of 30-60 nm.

Preferably, the nanometer alumina sol has a solid content of 20%-25%.

A method of preparing the ceramic slurry is: adding the fused magnesium oxide powder into a ball milling tank in accordance with the ratio: making a solution using the nanometer alumina sol, the rheological agent and deionized water and added therein the nanometer titanium oxide powder, ultrasonic treating the mixture for 30-60 minutes to cause the nanometer titanium oxide powder to be fully dispersed in the solution; adding the mixture into the ball milling tank; adding corundum balls in a ball to material ratio of 2:1; and ball milling for 2-4 hours with a rotation speed of 60-120 rpm until a uniform mixture is achieved; and then vacuum degassing for 10-15 minutes at a negative pressure of 0.02 MPa-0.05 MPa.

(2) Soaking a polyurethane foam template into the ceramic slurry, squeezing by a roller press the polyurethane foam template to remove redundant slurry therein to make a biscuit, and heating the biscuit to a temperature of 80° C.-120° C. to dry the biscuit.

The specification of the polyurethane foam template is 10 PPI-20 PPI (Pores per inch); the polyurethane foam template is first soaked in a water solution of 15%-20% NaOH at 40° C.-50° C. for surface etching for 40-60 minutes, washed by clean water and naturally dried, and then soaked into a water solution of 2%-4% wetting agent dodecylbenzene sulfonic acid, and taken out and dried before use. By NaOH etching, the surface of the polyurethane foam template is roughened, and after treated by the water solution of the wetting agent dodecylbenzene sulfonic acid, it will be easy for the ceramic slurry to be coated onto the polyurethane foam template.

(3) Putting the dried biscuit into a sintering furnace, elevating the temperature to 1400° C.-1600° C. for high temperature sintering, cooling to the room temperature with the furnace to obtain a magnesium oxide-based ceramic foam filter.

The sintering process is: the temperature is elevated to 550° C. at a temperature rising rate of 30° C./h to have organic substances (for example, the polyurethane foam and the rheological agent, among others) in the ceramic foam filter biscuit to be decomposed, gasified and discharged, then the temperature is elevated to 1100° C. at a temperature rising rate of 200° C./h. In the low temperature sintering stage, a lower temperature rising rate would be able to prevent the polyurethane foam and the rheological agent from being decomposed too quickly, which would cause the biscuit to collapse or be damaged due to deformation. Finally, the temperature is elevated to 1400° C.-1600° C. at a temperature rising rate of 50° C./h and the temperature is maintained for 2-3 hours. In the high temperature sintering stage, after the sintering temperature is above 1100° C., the lower temperature rising rate would be able to ensure a consistent temperature in the sintered body, and avoid a constant spinel formation rate and sintered body deformation and cracking due to extremely quick generation of phase transformation stresses.

The method for preparing the magnesium oxide-based ceramic foam filter provided by the present invention is simple, cost low, efficiency high and suitable for industrial scale production. The magnesium oxide-based ceramic foam filter so prepared is free of any components that decrease its chemical stability. The nanometer alumina sol can function as an adhesive, and the highly uniformly dispersed nanometer alumina sol and the nanometer titanium oxide react with the magnesium oxide particles to form an MA-$M_2T$ and the calculated results of the Gibbs free energy changes $\Delta G_1$, $\Delta G_5$, $\Delta G_6$, $\Delta G_7$ of the reactions (1), (5), (6) and (7) are shown in Table 1.

TABLE 1

The calculated results of the Gibbs free energy changes ΔG for the reactions in the reaction system of magnesium melt with Mg—Al spinel at 900-1200 K

| | Gibbs Free Energy of Substance G (kJ/mol) | | | | | Gibbs Free Energy ΔG of Reaction (kJ/mol) | | | |
|---|---|---|---|---|---|---|---|---|---|
| T (K) | Mg | Al | MgO | γ-$Al_2O_3$ | $MgAl_2O_4$ | $\Delta G_1$ | $\Delta G_5$ | $\Delta G_6$ | $\Delta G_7$ |
| 900 | −39.937 | −35.835 | −642.540 | −1744.794 | −2428.590 | −134.685 | −258.453 | −41.256 | −93.429 |
| 1000 | −47.208 | −42.645 | −650.503 | −1762.887 | −2454.192 | −132.288 | −254.694 | −40.802 | −91.486 |
| 1100 | −55.019 | −50.158 | −658.978 | −1782.290 | −2481.564 | −129.903 | −250.791 | −40.296 | −89.607 |
| 1200 | −63.127 | −57.960 | −667.925 | −1802.900 | −2510.578 | −127.414 | −246.673 | −39.753 | −87.661 | spinel solid solution that are chemically stable against the melt of magnesium and alloys thereof, and weld the magnesium oxide particles together. Therefore, the ceramic foam filter exhibits good strength, chemical stability and thermal shock resistance, and is especially useful for filtration and purification of the inclusions in the melt of magnesium and alloys thereof. It can also be used for filtration and purification of the melt of aluminum and alloys thereof. As compared to the prior art, the present invention achieves the following technical effects:

1. The MA-$M_2T$ spinel solid solution-reinforced magnesium oxide ceramic foam filter of the present invention exhibits excellent chemical stability. $TiO_2$ essentially does not have the solid solution function in MgO. The added nanometer titanium oxide of the technical solution of the present invention will facilitate the sintering of MgO and react with MgO to form a Mg—Ti spinel ($Mg_2TiO_4$, $M_2T$) phase that exhibits high chemical stability. Although the starting material alumina sol component comprises γ-$Al_2O_3$ that will react with the magnesium melt, the added nanometer alumina sol forms γ-$Al_2O_3$ coating film on the surfaces of the light calcined magnesium oxide particles and the highly uniformly dispersed nanometer $TiO_2$ powder, and in the sintering process, γ-$Al_2O_3$ in the alumina sol will perform an in-situ reaction with MgO in contact with it and form a Mg—Al spinel phase ($MgAl_2O_4$, MA). MA and $M_2T$ are completely dissolved with each other at a temperature above 1350° C. The XRD analysis results show that the ceramic foam filter prepared in accordance with the present invention comprises only periclase MgO and MA-$M_2T$ spinel solid solution phases.

In the reaction system of MgO-$Al_2O_3$ sintered ceramic with magnesium melt and addition of aluminum oxide, the following reactions may be present in addition to reaction equation (1):

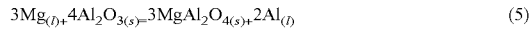

(5)

The reaction of aluminum oxide with magnesium oxide to form Mg—Al spinel $MgAl_2O_4$ is:

(6)

The reaction of magnesium melt with the Mg—Al spinel $MgAl_2O_4$ is:

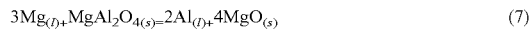

(7)

According to *Pure substance Thermochemical Data Handbook* (Edited by Barin Ihsan, Translated by Nailiang Cheng, Beijing: The Science Press, 2003), at 900-1200 K, the Gibbs free energies of the substances in the reaction system of magnesium melt with Mg—Al spinel $MgAl_2O_4$ The Gibbs free energy $\Delta G_5$ for the reaction equation (5), i.e., magnesium melt reacts with aluminum oxide to form Mg—Al spinel, is always the smallest at different temperatures, indicating that this reaction will happen first at common smelting and refining temperatures of magnesium alloys. Although reaction equation (7), i.e., liquid magnesium reacts with Mg—Al spinel, may be possible thermodynamically, this reaction is substantially a reaction between the liquid magnesium and the decomposed product of Mg—Al spinel, i.e., aluminum oxide. However, it can be known from Table 1 that the reaction of Mg—Al spinel being decomposed into aluminum oxide and magnesium oxide (the reverse reaction of reaction equation (6)) would be hard to happen, and the residual aluminum oxide in the sintered ceramic will also react with the liquid magnesium first in accordance with reaction equation (5) to form Mg—Al spinel. On the other hand, in the MgO—$Al_2O_3$ phase diagram, the MgO side is an eutectic phase diagram of MgO solid solution and MA spinel solid solution, and in the process of forming MA through in-situ reaction, there is essentially no dispersion of $O^{2-}$, but only interdiffusion of $Mg^{2+}$ and $Al^{3+}$ via fixed oxygen lattices, and the speed of formation is determined by $Al^{3+}$ that is with a slower diffusion. The MA phase is formed primarily on the $Al_2O_3$ side by endotaxy growth, resulting in formation of limited solid solution between MA phase and MgO, and the MgO content in the exterior MA layer contacting the MgO particles is much higher than the average thereof. Since MgO does not react with Mg melt, the Mg—Al spinel phase in the sintered ceramic structure which welds the MgO particles together will be able to present stably in the magnesium melt.

The MA-$M_2T$ spinel solid solution-reinforced magnesium oxide-based foam ceramic filter of the present invention does not comprise any components that decrease its chemical stability. The added nanometer alumina sol not only forms γ-$Al_2O_3$ coating film on the surfaces of the light calcined magnesium oxide particles and the highly uniformly dispersed nanometer $TiO_2$ powder and functions as an adhesive, in the sintering process, $Al_2O_3$ and $TiO_2$ will perform an in-situ reaction with MgO and form an MA-$M_2T$ spinel solid solution phase, and thus avoids the damage to the chemical stability of the ceramic foam due to addition of adhesives such as silica sol, ethyl silicate, among others, to the prior art products. Furthermore, the ceramic components are free of sodium salts (for example, sodium carboxymethyl cellulose is not used in the rheological agent), which removes the obstacle for the ceramic sintering which is caused by residual $Na^+$ having a greater ion radius.

Since the reaction equations (1) and (5) can take place spontaneously at the commonly used smelting temperatures, and the smelting temperatures of aluminum and alloys thereof are the same as the smelting temperatures of magnesium and alloys thereof, adverse reactions of equations (1) and (5) will not take place between MgO, MA spinel phase and the melt of aluminum and alloys thereof. As with the melt of magnesium and alloys thereof, this avoids the damage to the chemical stability of ceramic foam in the melt of aluminum and alloys thereof due to addition of adhesives such as silica sol, ethyl silicate, among others. Even if the materials comprise 1% of $SiO_2$, the reaction of $Al+SiO_2 \rightarrow Al_2O_3+Si$ will take place at a high temperature between the melt of aluminum and alloys thereof and $SiO_2$ in the ceramic. Therefore, the MA-$M_2$T spinel solid solution-reinforced magnesium oxide ceramic foam filter of the present invention can also be used in the smelting and purification of aluminum and alloys thereof.

2. The MA-$M_2$T spinel solid solution-reinforced magnesium oxide ceramic foam filter of the present invention has good low temperature sintering performance. In the technical solution of the present invention, nanometer titanium oxide is added to the ceramic component. As a changeable electrovalence oxide, $Ti^{4+}$ will be dispersed into the crystal of MgO, which increases defects in the crystal (such as, for example, vacancies) that activate the lattice, and forms a solid solution that $Mg^{2+}$ ions are substituted by $Ti^{4+}$ ions, thereby facilitating direct intergranular bonding. The lattice constant of $Al_2O_3$ is close to that of MgO, and in the sintering process, $Al_2O_3$ can be solid-solubilized to the lattices of MgO and cause a lattice distortion to the MgO crystal. The diffusion rate of $Al^{3+}$ is small, and the solubility of $Al_2O_3$ in periclase MgO is very small (only 3% at 1700° C.). The sintering process is primarily to form a new compound MA phase through sintering reactions, and a limited solid solution between the MA phase and MgO, so as to facilitate the sintering and the bonding of the particles. Nanometer powder means a super-fine powder having a particle size less than 100 nm, and has the characteristics of high specific surface area, high surface energy and high activity, among others. Therefore, nanometer powder can be readily bonded to other atoms, and the melting point and sintering temperature would be much lower than a fine powder. The sintering aid added in the form of nanometer titanium oxide and nanometer alumina sol can fill the space between the fine powder particles, which optimizes the match and mixing uniformity of ceramic particles. Furthermore, due to the nanometer powder's surface and interface effect, the full contact of the nanometer titanium oxide and the highly active nanometer $\gamma$-$Al_2O_3$ in the alumina sol with the MgO particles will increase the reaction speed quickly, thereby decreasing the sintering temperature and increasing the density and mechanical properties thereof, and the decrease of the sintering temperature will be helpful in reducing the energy consumption and the production cost of the ceramic foam filter. The experimental results show that, when the sintering temperature is below 1400° C., the bonding of the sintering structure between the MgO particles is not sufficient, resulting in a lower strength of the product. The sintering temperature of the structurally well bonded MA-$M_2$T spinel solid solution-reinforced magnesium oxide foam ceramic filter is 1400° C.-1600° C.

3. The MA-$M_2$T spinel solid solution-reinforced magnesium oxide ceramic foam filter of the present invention has good thermal shock resistance. The present invention uses fused magnesium oxide that has high anti-hydration ability. Since the formation of MA by sintering through the reaction of magnesium oxide and aluminum oxide will cause a volume expansion (linear expansion rate being 2.3%; volume expansion rate being 6.9%), it increases the sintering burden. The metastable transitional crystal structure that $Al^{3+}$ is distributed irregularly in the octahedral and tetrahedral voids formed by oxygen ions is the same with the Mg—Al spinel MA crystal structure. By substituting $\gamma$-$Al_2O_3$ for $\alpha$-$Al_2O_3$, the sintering characteristics of MgO-MA material will be changed wherein the volume of MA will contract for 2.7%, thereby increasing the sintering density. In the solution provided in the present invention, the particulate fused magnesium oxide is wrapped by continuous nanometer alumina sol film and in close contact with the highly dispersed nanometer titanium oxide particles, which in the sintering process perform in-situ reactions with MgO to form a Mg—Al spinel MA phase and a Mg—Ti spinel $M_2$T phase, which are fully dissolved with each other at a temperature above 1350° C., directly weld the MgO particles together in the sintering process and form intergranular secondary spinels (intergranular spinel) $M_2$T and MA by exsolution precipitation upon cooling, which may compensate for the stress at the phase interfaces which results in a stress relaxation of the material when cooled after sintering. Furthermore, the pinning effect of the spinel solid solution phases will inhibit the fast growth of MgO particles, so as to refine the microstructure of the ceramic foam and increase the compactness of the ceramic. Compared to MgO and $Al_2O_3$, the spinel phase has a small thermal expansion factor and a low thermal conductivity. Therefore, the MA-$M_2$T spinel solid solution-reinforced magnesium oxide-based ceramic foam filter so prepared has relatively high mechanical properties, high temperature impact resistance and thermal shock resistance.

Furthermore, the polyurethane foam plastic is a surface inactive hydrophobic material and has poor wettability with respect to the ceramic slurry. Thus, this would affect the slurry coating performance of the template. In the preparation method of the present invention, the etching of the polyurethane foam plastic template by NaOH makes the surface thereof roughened, and together with the treatment by a water solution of wetting agent dodecyl benzene sulfonate, the ceramic slurry can be easily coated to the polyurethane foam template. Additionally, the rheological agent, i.e., the cellulose ether and polyacrylic acid, is not only a good dispersant for the nanometer titanium oxide powder which prevents the slurry from being agglomerated, but also serves as an adhesive in the preparation of the biscuit. Upon soaking, the slurry can be securely adhered to the polyurethane foam template, which imparts the biscuit a very big strength, and the rheological agent can escape very easily in the sintering process without contaminating the article. Therefore, the quality of the ceramic foam filter is guaranteed.

BRIEF DESCRIPTION OF THE DRAWINGS

FIG. 1 is the flow diagram of the process for preparing the MA-$M_2$T spinel solid solution-reinforced magnesium oxide-based foam ceramic filter.

DETAILED DESCRIPTION OF THE EMBODIMENTS OF THE INVENTION

The present invention will be further described by referring to the accompany drawing and embodiments.

The MA-$M_2$T spinel solid solution-reinforced magnesium oxide-based foam ceramic filter is obtained by coating onto a polyurethane foam carrier a slurry of light calcined magnesium oxide-based ceramic comprising a nanometer titanium oxide sintering aid, and then drying and sintering. The detailed process of preparation is shown in FIG. 1.

EXAMPLE 1

With the ratio that nanometer titanium oxide accounts for 1% by mass of ceramic powder, a nanometer titanium oxide having a particle size of 30 nm and a fused magnesium oxide powder having a particle size of the order of 250 meshes (mean size $d_{50}$ being 58 μm) were dosed to prepare a ceramic powder. With a mass ratio of 1:4 (polyacrylic acid: hydroxyethyl cellulose), a rheological agent was prepared by polyacrylic acid and hydroxyethyl cellulose.

With the following mass percentages, 15% nanometer alumina sol having a solid content of 20% (a commercial nanometer alumina sol having a pH value of about neutral was selected, the same for the following Examples), 0.8% rheological agent and the balance ceramic powder were dosed. In accordance with the ratio, the fused magnesium oxide powder was first added into a ball milling tank; the nanometer alumina sol, the rheological agent and a suitable amount of deionized water (the amount to be determined by the solid content of the ceramic slurry, the same for the following Examples) were mixed and subjected to an ultrasonic treatment for 30 minutes to have the nanometer titanium oxide powder fully dispensed prior to being added to the ball milling tank; with a ratio of 2:1 of ball to material, corundum balls were added, and ball milling was performed for 4 hours with a rotation speed of 60 rpm to achieve a uniform mixture, and then vacuum degassing for 15 minutes at a negative pressure 0.02 MPa to obtain a ceramic slurry having a solid content of 60%.

A 10 PPI polyurethane foam plastic template was subjected to a surface etching for 60 minutes in a 40° C. water solution of 15% NaOH, and then washed by clean water and dried naturally. Next, the template was soaked in a water solution of 2% dodecylbenzene sulfonic acid wetting agent, and then taken out and dried. The polyurethane foam plastic template was then soaked in the ceramic slurry, and a roller press was used to squeeze the polyurethane foam plastic template to remove the redundant slurry to form a biscuit. The biscuit was then dried by heating it to 80° C.

The dried biscuit was put in a sintering furnace, and the temperature was elevated to 550° C. at a temperature rising rate of 30° C./h to have organic substances such as the polyurethane foam and rheological agent, among others, in the ceramic foam filter biscuit decomposed, gasified and discharged, then the temperature was elevated to 1100° C. at a temperature rising rate of 200° C./h. Finally, the temperature was elevated to 1600° C. at a temperature rising rate of 50° C./h and the temperature was maintained for 2.5 hours. The biscuit was then cooled to the room temperature with the furnace to obtain a magnesium oxide-based ceramic foam filter.

EXAMPLE 2

With the ratio that nanometer titanium oxide accounts for 2% by mass of ceramic powder, a nanometer titanium oxide having a particle size of 60 nm and a fused magnesium oxide powder having a particle size of the order of 500 meshes (mean size $d_{50}$ being 25 μm) were dosed to prepare a ceramic powder. With a mass ratio of 1:4 (polyacrylic acid: hydroxypropyl methyl cellulose), a rheological agent was prepared by polyacrylic acid and hydroxypropyl methyl cellulose.

With the following mass percentages, 20% nanometer alumina sol having a solid content of 25%, 1.5% rheological agent and the balance ceramic powder were dosed. In accordance with the ratio, the fused magnesium oxide powder was first added into a ball milling tank; the nanometer alumina sol, the rheological agent and a suitable amount of deionized water were mixed and subjected to an ultrasonic treatment for 45 minutes to have the nanometer titanium oxide powder fully dispensed prior to being added to the ball milling tank; with a ratio of 2:1 of ball to material, corundum balls were added, and ball milling was performed for 2 hours with a rotation speed of 120 rpm to achieve a uniform mixture, and then vacuum degassing for 10 minutes at a negative pressure 0.05 MPa to obtain a ceramic slurry having a solid content of 65%.

A 20 PPI polyurethane foam plastic template was subjected to a surface etching for 40 minutes in a 50° C. water solution of 20% NaOH, and then washed by clean water and dried naturally. Next, the template was soaked in a 4% water solution of dodecylbenzene sulfonic acid wetting agent, and then taken out and dried. The polyurethane foam plastic template was then soaked in the ceramic slurry, and a roller press was used to squeeze the polyurethane foam plastic template to remove the redundant slurry to form a biscuit. The biscuit was then dried by heating it to 120° C.

The dried biscuit was put in a sintering furnace, and the temperature was elevated to 550° C. at a temperature rising rate of 30° C./h to have organic substances such as the polyurethane foam and rheological agent, among others, in the ceramic foam filter biscuit decomposed, gasified and discharged, then the temperature was elevated to 1100° C. at a temperature rising rate of 200° C./h. Finally, the temperature was elevated to 1400° C. at a temperature rising rate of 50° C./h and the temperature was maintained for 3 hours. The biscuit was then cooled to the room temperature with the furnace to obtain a magnesium oxide-based ceramic foam filter.

EXAMPLE 3

With the ratio that nanometer titanium oxide accounts for 1.5% by mass of ceramic powder, a nanometer titanium oxide having a particle size of 50 nm and a fused magnesium oxide powder having a particle size of the order of 325 meshes (mean size $d_{50}$ being 45 μm) were dosed to prepare a ceramic powder. With a mass ratio of 1:4 (polyacrylic acid: hydroxyethyl cellulose), a rheological agent was prepared by polyacrylic acid and hydroxyethyl cellulose.

With the following mass percentages, 25% nanometer alumina sol having a solid content of 22%, 1.0% rheological agent and the balance ceramic powder were dosed. In accordance with the ratio, the fused magnesium oxide powder was first added into a ball milling tank; the nanometer alumina sol, the rheological agent and a suitable amount of deionized water were mixed and subjected to an ultrasonic treatment for 60 minutes to have the nanometer titanium oxide powder fully dispensed prior to being added to the ball milling tank; with a ratio of 2:1 of ball to material, corundum balls were added, and ball milling was performed for 3 hours with a rotation speed of 90 rpm to achieve a uniform mixture, and then vacuum degassing for 12 minutes at a negative pressure 0.03 MPa to obtain a ceramic slurry having a solid content of 70%.

A 15 PPI polyurethane foam plastic template was subjected to a surface etching for 50 minutes in a 45° C. water solution of 18% NaOH, and then washed by clean water and dried naturally. Next, the template was soaked in a 3% water solution of dodecylbenzene sulfonic acid wetting agent, and then taken out and dried. The polyurethane foam plastic template was then soaked in the ceramic slurry, and a roller press was used to squeeze the polyurethane foam plastic template to remove the redundant slurry to form a biscuit. The biscuit was then dried by heating it to 100° C.

The dried biscuit was put in a sintering furnace, and the temperature was elevated to 550° C. at a temperature rising rate of 30° C./h to have organic substances such as the polyurethane foam and rheological agent, among others, in the ceramic foam filter biscuit decomposed, gasified and discharged, then the temperature was elevated to 1100° C. at a temperature rising rate of 200° C./h. Finally, the temperature was elevated to 1500° C. at a temperature rising rate of 50° C./h and the temperature was maintained for 2 hours. The biscuit was then cooled to the room temperature with the furnace to obtain a magnesium oxide-based ceramic foam filter.

EXAMPLE 4

With the ratio that nanometer titanium oxide accounts for 2% by mass of ceramic powder, a nanometer titanium oxide having a particle size of 60 nm and a fused magnesium oxide powder having a particle size of the order of 300 meshes (mean size $d_{50}$ being 48 μm) were dosed to prepare a ceramic powder. With a mass ratio of 2:4:4 (polyacrylic acid: hydroxypropyl methyl cellulose:hydroxyethyl cellulose), a rheological agent was prepared by polyacrylic acid, hydroxypropyl methyl cellulose and hydroxyethyl cellulose.

With the following mass percentages, 20% nanometer alumina sol having a solid content of 20%, 1.0% rheological agent and the balance ceramic powder were dosed. In accordance with the ratio, the fused magnesium oxide powder was first added into a ball milling tank; the nanometer alumina sol, the rheological agent and a suitable amount of deionized water were mixed and subjected to an ultrasonic treatment for 45 minutes to have the nanometer titanium oxide powder fully dispensed prior to being added to the ball milling tank; with a ratio of 2:1 of ball to material, corundum balls were added, and ball milling was performed for 3 hours with a rotation speed of 100 rpm to achieve a uniform mixture, and then vacuum degassing for 15 minutes at a negative pressure 0.02 MPa to obtain a ceramic slurry having a solid content of 65%.

A 15 PPI polyurethane foam plastic template was subjected to a surface etching for 50 minutes in a 45° C. water solution of 15% NaOH, and then washed by clean water and dried naturally. Next, the template was soaked in a water solution of 4% dodecylbenzene sulfonic acid wetting agent, and then taken out and dried. The polyurethane foam plastic template was then soaked in the ceramic slurry, and a roller press was used to squeeze the polyurethane foam plastic template to remove the redundant slurry to form a biscuit. The biscuit was then dried by heating it to 100° C.

The dried biscuit was put in a sintering furnace, and the temperature was elevated to 550° C. at a temperature rising rate of 30° C./h to have organic substances such as the polyurethane foam and rheological agent, among others, in the ceramic foam filter biscuit decomposed, gasified and discharged, then the temperature was elevated to 1100° C. at a temperature rising rate of 200° C./h. Finally, the temperature was elevated to 1550° C. at a temperature rising rate of 50° C./h and the temperature was maintained for 2 hours. The biscuit was then cooled to the room temperature with the furnace to obtain a magnesium oxide-based ceramic foam filter.

In the above Examples, the experiments show that the ceramic foams prepared exhibited excellent thermal shock resistance and strength. The ceramic foams did not exhibit cracking after 50 times cooling in 900° C. air, and the natural temperature strength of the 10 PPI ceramic foam filters with a size of 75 mm×75 mm×25 mm was not less than 2 MPa.

The Examples described above would not limit the present invention in any way. All technical solutions obtained by equivalent substitutions or transformations are within the scope of present invention.

What is claimed is:

1. A method for preparing an MA-M$_2$T spinel solid solution-reinforced magnesium oxide-based ceramic foam filter wherein the method comprises the steps of:
   1) preparing a ceramic slurry having a solid content of 60 wt. %-70 wt. % by dosing 15%-25% by mass of a nanometer alumina sol, 0.8%-1.5% by mass of a rheological agent, and the balance magnesium oxide ceramic powder comprising a nanometer titanium oxide sintering aid, and then adding deionized water and ball milling to mix until uniform, and vacuum degassing the mixture; the rheological agent is a mixture of polyacrylic acid and a cellulose ether, wherein polyacrylic acid accounts for 20% of the mass of the rheological agent, the cellulose ether is one of industrial-use hydroxyethyl cellulose and hydroxy propyl methyl cellulose, or a mixture thereof; the magnesium oxide ceramic powder comprising a nanometer titanium oxide sintering aid is a mixture of a magnesium oxide powder and a nanometer titanium oxide powder;
   2) soaking a polyurethane foam plastic template into the ceramic slurry, squeezing by a roller press the polyurethane foam plastic template to remove redundant slurry to make a biscuit, and drying the biscuit by heating it to 80° C.-120° C.;
   3) putting the dried biscuit into a sintering furnace, elevating the temperature to 1400° C.-1500° C. and performing a high temperature sintering, cooling to the room temperature with the furnace to obtain the magnesium oxide-based ceramic foam filter.

2. The method for preparing an MA-M$_2$T spinel solid solution-reinforced magnesium oxide-based ceramic foam filter according to claim 1, wherein the nanometer alumina sol has a solid content of 20%-25%.

3. The method for preparing an MA-M$_2$T spinel solid solution-reinforced magnesium oxide-based ceramic foam filter according to claim 1, wherein the nanometer titanium oxide powder accounts for 1-2% by mass of the ceramic powder.

4. The method for preparing an MA-M$_2$T spinel solid solution-reinforced magnesium oxide-based ceramic foam filter according to claim 1, wherein the magnesium oxide powder is a fused magnesium oxide powder having a particle size in the order of 250-500 meshes.

5. The method for preparing an MA-M$_2$T spinel solid solution-reinforced magnesium oxide-based ceramic foam filter according to claim 2, wherein the nanometer titanium oxide powder has a particle size of 30-60 nm.

6. The method for preparing an MA-M$_2$T spinel solid solution-reinforced magnesium oxide-based ceramic foam filter according to claim 1, wherein a method of preparing the ceramic slurry is: with the ratio, adding a fused magnesium oxide powder into a ball milling tank; making a solution using the nanometer alumina sol, the rheological agent and deionized water and added therein the nanometer titanium oxide powder, ultrasonic treating the mixture for 30-60 minutes to have the nanometer titanium oxide powder fully dispersed in the solution; adding the mixture into the ball milling tank; with a ball to material ratio of 2:1, adding corundum balls and ball milling for 2-4 hours with a rotation speed of 60-120 rpm until a uniform mixture is achieved, and then vacuum degassing for 10-15 minutes at a negative pressure of 0.02 MPa-0.05 MPa.

7. The method for preparing an $MA-M_2T$ spinel solid solution-reinforced magnesium oxide-based ceramic foam filter according to claim 1, wherein the specification of the polyurethane foam template is 10 PPI-20 PPI; the polyurethane foam template is first soaked in a water solution of 15% -20% NaOH at 40° C.-50° C. for surface etching for 40-60 minutes, washed by clean water and naturally dried, and then soaked into a water solution of 2% -4% wetting agent dodecylbenzene sulfonic acid and taken out and dried.

8. The method for preparing an $MA-M_2T$ spinel solid solution-reinforced magnesium oxide-based ceramic foam filter according to claim 1, wherein in step 3), the sintering process is: the temperature is first elevated to 550° C. at a temperature rising rate of 30° C./h to have organic substances in the ceramic foam filter biscuit decomposed, gasified and discharged, then the temperature is elevated to 1100° C. at a temperature rising rate of 200° C./h, and finally, the temperature is elevated to 1400° C.-1600° C. at a temperature rising rate of 50° C./h and the temperature is maintained for 2-3 hours.

9. A $MA-M_2T$ spinel solid solution-reinforced magnesium oxide-based ceramic foam filter prepared according to the method of claim 1.

\* \* \* \* \*